United States Patent
Hirai et al.

(10) Patent No.: US 11,224,844 B2
(45) Date of Patent: Jan. 18, 2022

(54) POROUS MEMBRANE FOR WATER TREATMENT USE

(71) Applicant: KANEKA CORPORATION, Osaka (JP)

(72) Inventors: Yusuke Hirai, Hyogo (JP); Tadashi Kamada, Osaka (JP); Hideto Matsuyama, Hyogo (JP); Li-Feng Fang, Hyogo (JP); Sheng-Yao Wang, Hyogo (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 16/713,420

(22) Filed: Dec. 13, 2019

(65) Prior Publication Data

US 2020/0114318 A1 Apr. 16, 2020

Related U.S. Application Data

(63) Continuation of application No. PCT/JP2018/020565, filed on May 29, 2018.

(30) Foreign Application Priority Data

Jun. 15, 2017 (JP) .............................. JP2017-118017
Aug. 8, 2017 (JP) .............................. JP2017-153496

(51) Int. Cl.
| | | |
|---|---|---|
| *B01D 71/42* | (2006.01) | |
| *B01D 67/00* | (2006.01) | |
| *B01D 69/08* | (2006.01) | |
| *B01D 71/30* | (2006.01) | |

(52) U.S. Cl.
CPC ......... *B01D 71/42* (2013.01); *B01D 67/0093* (2013.01); *B01D 69/08* (2013.01); *B01D 71/30* (2013.01); *B01D 2325/02* (2013.01); *B01D 2325/36* (2013.01)

(58) Field of Classification Search
CPC .... B01D 71/42; B01D 67/0093; B01D 71/30; B01D 69/08; B01D 2325/02; B01D 2325/36; C08F 220/44; C08J 9/26
See application file for complete search history.

(56) References Cited

U.S. PATENT DOCUMENTS

| | | | |
|---|---|---|---|
| 3,615,024 A * | 10/1971 | Michaels | ............... B01D 69/02 210/490 |
| 3,750,735 A | 8/1973 | Chiang et al. | |
| 3,950,247 A | 4/1976 | Chiang et al. | |
| 4,035,291 A | 7/1977 | Chiang et al. | |
| 4,067,805 A | 1/1978 | Chiang et al. | |
| 4,199,445 A | 4/1980 | Chiang et al. | |
| 2012/0318730 A1 | 12/2012 | Tamai et al. | |

FOREIGN PATENT DOCUMENTS

| | | |
|---|---|---|
| CN | 1103604 | 6/1995 |
| CN | 1214710 | 4/1999 |
| CN | 1649945 | 8/2005 |
| CN | 103097009 | 5/2013 |
| EP | 2543429 A1 | 1/2013 |
| GB | 1238180 A | 7/1971 |
| GB | 1351187 A | 4/1974 |
| GB | 1474594 A | 5/1977 |
| JP | S50-14580 A | 2/1975 |
| JP | S50-22508 B1 | 7/1975 |
| JP | S53-44486 A | 4/1978 |
| JP | S54-10548 B1 | 5/1979 |
| JP | S61-90708 A | 5/1986 |
| JP | 2000-24475 A | 1/2000 |
| JP | 2007283287 A | 11/2007 |
| WO | 2011/108580 A1 | 9/2011 |

OTHER PUBLICATIONS

M. Shimamura et al., "Wet spinning of acrylonitrile-p-sodium styrenesulfonate copolymer", Journal of the Chemical Society of Japan, Industrial chemistry Section, vol. 71, No. 8, 1968, edited and published by the Chemical Society of Japan, with English partial translation (7 pages).

International Search Report issued in International Application No. PCT/JP2018/020565, dated Sep. 4, 2018 (2 pages).

Extended European Search Report issued in corresponding European Application No. 18816647.4, dated Mar. 15, 2021 (10 pages).

P. Aebischer et al., "Macroencapsulation of dopamine-secreting cells by coextrusion with an organic polymer solution", Biomaterials, vol. 12, Issue 1, 1991, pp. 50-56 (7 pages).

H. P. Gregor et al., "Interpolymer Ion-Selective Membranes. I. Preparation and Characterization of Polycarboxylic Acid-Dynel Membranes", The Journal of Physical Chemistry, 1957 61 (2), 147-151 (7 pages).

(Continued)

*Primary Examiner* — Vishal V Vasisth

(74) *Attorney, Agent, or Firm* — Oblon, McClelland, Maier & Neustadt, L.L.P.

(57) ABSTRACT

A porous membrane includes a modacrylic copolymer. The modacrylic copolymer includes, with respect to 100 parts by mass of all structural units constituting the modacrylic copolymer, 15 to 85 parts by mass of a structural unit derived from acrylonitrile, 15 to 85 parts by mass of a structural unit derived from at least one halogen-containing monomer selected from the group consisting of vinyl halide and vinylidene halide, and 0 to 10 parts by mass of a structural unit derived from a vinyl monomer having an ionic substituent. The porous membrane can be produced by preparing a modacrylic copolymer solution by dissolving the modacrylic copolymer in a solvent, and bringing the modacrylic copolymer solution into contact with a nonsolvent for the modacrylic copolymer such that the modacrylic copolymer solution is solidified.

13 Claims, No Drawings

(56) References Cited

OTHER PUBLICATIONS

First Office Action dated Jun. 29, 2021, in Chinese patent application No. 201880037319.8, with machine translation, citing documents AO-AR—19 pages.

* cited by examiner

POROUS MEMBRANE FOR WATER TREATMENT USE

This application is a CON of PCT/JP2018/020565, filed May 29, 2018.

TECHNICAL FIELD

One or more embodiments of the present invention relate to a porous membrane that can be used for water treatment and a method for producing the porous membrane. Specifically, one or more embodiments of the present invention relate to a porous membrane with excellent antifouling properties and a method for producing the porous membrane.

BACKGROUND

Many water treatment methods for removing impurities contained in, e.g., river water and industrial water have been developed. One of the methods is a membrane filtration method. The membrane filtration method is used in many fields such as cartridges for water purifiers and membrane units for waste water treatment. A wide variety of filter media, including ceramics, inorganic materials, and polymers, have been developed for use in the membrane filtration method. In particular, a polymeric porous membrane has the following features: the membrane with a stable quality can be continuously produced in large quantities; and the pore size of the membrane can be relatively freely controlled by adjusting the membrane formation conditions.

The polymeric porous membrane is required to improve properties such as membrane strength, a water permeation rate, a rejection rate for components to be filtered out, and antifouling properties. A number of technologies have been developed so far to improve these properties. For example, Patent Document 1 discloses a method for producing a polymer membrane for water treatment that is composed of a vinyl chloride copolymer containing a vinyl chloride monomer and a hydrophilic monomer as structural units. Patent Document 2 discloses a technology that relates to a polyvinylidene fluoride porous membrane.

PATENT DOCUMENTS

Patent Document 1: WO 2011/108580
Patent Document 2: JP 2007-283287 A

In Patent Document 1, a polymer membrane for water treatment having the above properties can be produced when the polymer membrane particularly includes a vinyl alcohol structure as a hydrophilic monomer. The polyvinylidene fluoride porous membrane of Patent Document 2 is excellent because of its good chemical resistance and high strength. However, the polyvinylidene fluoride porous membrane has relatively low fouling resistance, since the raw materials themselves are highly hydrophobic. In particular, the improvement in the antifouling properties of a porous membrane increases the water permeation rate and reduces the maintenance frequency during the actual use, which directly leads to a reduction in running costs. Therefore, a further improvement in the antifouling properties is always desired.

SUMMARY

One or more embodiments of the present invention provide a porous membrane that has practically sufficient membrane strength, water permeation rate, and rejection rate for components to be filtered out and particularly has good antifouling properties, and a method for producing the porous membrane.

One or more embodiments of the present invention relate to a porous membrane including a modacrylic copolymer. The modacrylic copolymer contains 15 parts by mass or more and 85 parts by mass or less of a structural unit derived from acrylonitrile, 15 parts by mass or more and 85 parts by mass or less of a structural unit derived from at least one halogen-containing monomer selected from the group consisting of vinyl halide and vinylidene halide, and 0 parts by mass or more and 10 parts by mass or less of a structural unit derived from a vinyl monomer having an ionic substituent with respect to 100 parts by mass of all structural units constituting the modacrylic copolymer.

It may be preferable that the modacrylic copolymer contains more than 50 parts by mass and 70 parts by mass or less of a structural unit derived from acrylonitrile and 30 parts by mass or more and less than 50 parts by mass of a structural unit derived from at least one halogen-containing monomer selected from the group consisting of vinyl halide and vinylidene halide with respect to 100 parts by mass of all structural units constituting the modacrylic copolymer.

It may be preferable that the modacrylic copolymer contains 15 parts by mass or more and 84.5 parts by mass or less of a structural unit derived from acrylonitrile, parts by mass or more and 84.5 parts by mass or less of a structural unit derived from at least one halogen-containing monomer selected from the group consisting of vinyl halide and vinylidene halide, and 0.5 parts by mass or more and 5 parts by mass or less of a structural unit derived from a vinyl monomer having an ionic substituent with respect to 100 parts by mass of all structural units constituting the modacrylic copolymer.

The ionic substituent in the vinyl monomer having an ionic substituent may be a strong electrolysis type anionic substituent. The ionic substituent in the vinyl monomer having an ionic substituent may be preferably a sulfonic acid group.

The halogen-containing monomer may be preferably at least one selected from the group consisting of vinyl chloride and vinylidene chloride.

The porous membrane may have any one shape selected from the group consisting of a hollow fiber shape, a flat membrane shape, a spiral shape, a pleated shape, and a tubular shape.

One or more embodiments of the present invention relate to a method for producing the porous membrane. The method includes the following: preparing a modacrylic copolymer solution by dissolving a modacrylic copolymer in a good solvent; and bringing the modacrylic copolymer solution into contact with a non-solvent for the modacrylic copolymer so that the modacrylic copolymer solution is solidified to form a porous membrane. The modacrylic copolymer contains 15 parts by mass or more and 85 parts by mass or less of a structural unit derived from acrylonitrile, 15 parts by mass or more and 85 parts by mass or less of a structural unit derived from at least one halogen-containing monomer selected from the group consisting of vinyl halide and vinylidene halide, and 0 parts by mass or more and 10 parts by mass or less of a structural unit derived from a vinyl monomer having an ionic substituent with respect to 100 parts by mass of all structural units constituting the modacrylic copolymer.

One or more embodiments of the present invention can provide a porous membrane that has practically sufficient membrane strength, water permeation rate, and rejection rate for components to be filtered out and particularly has good antifouling properties. Moreover, the production method in one or more embodiments of the present invention can easily produce a porous membrane that has practically sufficient membrane strength, water permeation rate, and rejection rate for components to be filtered out and particularly has good antifouling properties.

DETAILED DESCRIPTION OF THE EMBODIMENTS

The present inventors conducted intensive studies to improve the antifouling properties of a polymeric porous membrane while ensuring the membrane strength, the water permeation rate, and the rejection rate for components to be filtered out. Consequently the present inventors found that when a porous membrane included a modacrylic copolymer containing a structural unit derived from acrylonitrile and a structural unit derived from at least one halogen-containing monomer selected from the group consisting of vinyl halide and vinylidene halide, the porous membrane had practically sufficient membrane strength, water permeation rate, and rejection rate for components to be filtered out and particularly had good antifouling properties. Based on these findings, the present inventors have reached the present invention. In particular, the present inventors found out that the antifouling properties of the porous membrane was further improved by using a modacrylic copolymer containing a predetermined amount of a structural unit derived from a vinyl monomer having an ionic substituent in addition to the structural unit derived from acrylonitrile and the structural unit derived from at least one halogen-containing monomer selected from the group consisting of vinyl halide and vinylidene halide.

Hereinafter, one or more embodiments of the present invention will be described in detail. The present invention is not limited to the following embodiments.

In one or more embodiments of the present invention, the term "porous membrane" means a membrane having many micropores in it, where the micropores are connected to each other. This structure allows a gas or liquid to pass from one side to the other side of the membrane. In one or more embodiments of the present invention, the internal structure of the porous membrane can be confirmed by observing the cross section of the porous membrane with a scanning electron microscope.

In one or more embodiments of the present invention, the porous membrane includes a modacrylic copolymer containing a structural unit derived from acrylonitrile and a structural unit derived from at least one halogen-containing monomer selected from the group consisting of vinyl halide and vinylidene halide. Thus, in one or more embodiments of the present invention, the porous membrane includes the modacrylic copolymer that is obtained by copolymerization of acrylonitrile and a halogen-containing monomer selected from the group consisting of vinyl halide and vinylidene halide. In one or more embodiments of the present invention, it may be preferable that the porous membrane includes a modacrylic copolymer containing a structural unit derived from acrylonitrile, a structural unit derived from at least one halogen-containing monomer selected from the group consisting of vinyl halide and vinylidene halide, and a structural unit derived from a vinyl monomer having an ionic substituent. Thus, in one or more embodiments of the present invention, the porous membrane may preferably include the modacrylic copolymer that is obtained by copolymerization of acrylonitrile, a halogen-containing monomer selected from the group consisting of vinyl halide and vinylidene halide, and a vinyl monomer having an ionic substituent. Unless otherwise noted in the present specification, the halogen-containing monomer means at least one halogen-containing monomer selected from the group consisting of vinyl halide and vinylidene halide.

In one or more embodiments of the present invention, the modacrylic copolymer contains 15 parts by mass or more and 85 parts by mass or less of a structural unit derived from acrylonitrile, 15 parts by mass or more and 85 parts by mass or less of a structural unit derived from the halogen-containing monomer, and 0 parts by mass or more and 10 parts by mass or less of a structural unit derived from a vinyl monomer having an ionic substituent with respect to 100 parts by mass of all structural units constituting the modacrylic copolymer. It may be preferable that the modacrylic copolymer contains 30 parts by mass or more and 70 parts by mass or less of a structural unit derived from acrylonitrile, 30 parts by mass or more and 70 parts by mass or less of a structural unit derived from the halogen-containing monomer, and 0 parts by mass or more and 10 parts by mass or less of a structural unit derived from a vinyl monomer having an ionic substituent with respect to 100 parts by mass of all structural units constituting the modacrylic copolymer. It may be more preferable that the modacrylic copolymer contains more than 50 parts by mass and 70 parts by mass or less of a structural unit derived from acrylonitrile, 30 parts by mass or more and less than 50 parts by mass of a structural unit derived from the halogen-containing monomer, and 0 parts by mass or more and 10 parts by mass or less of a structural unit derived from a vinyl monomer having an ionic substituent with respect to 100 parts by mass of all structural units constituting the modacrylic copolymer. It may be further preferable that the modacrylic copolymer contains 50.5 parts by mass or more and 60 parts by mass or less of a structural unit derived from acrylonitrile, 40 parts by mass or more and 49.5 parts by mass or less of a structural unit derived from the halogen-containing monomer, and 0 parts by mass or more and parts by mass or less of a structural unit derived from a vinyl monomer having an ionic substituent with respect to 100 parts by mass of all structural units constituting the modacrylic copolymer. When the contents of the structural unit derived from acrylonitrile and the structural unit derived from the halogen-containing monomer are within the above ranges, the porous membrane can have excellent chemical resistance and antifouling properties.

In one or more embodiments of the present invention, from the viewpoint of further improving the antifouling properties, it may be preferable that the porous membrane includes a modacrylic copolymer containing a structural unit derived from acrylonitrile, a structural unit derived from the halogen-containing monomer, and a structural unit derived from a vinyl monomer having an ionic substituent. Thus, in one or more embodiments of the present invention, the porous membrane may preferably include the modacrylic copolymer that is obtained by copolymerization of acrylonitrile, the halogen-containing monomer, and a vinyl monomer having an ionic substituent.

In one or more embodiments of the present invention, it may be preferable that the modacrylic copolymer contains 15 parts by mass or more and 84.5 parts by mass or less of a structural unit derived from acrylonitrile, 15 parts by mass or more and 84.5 parts by mass or less of a structural unit derived from the halogen-containing monomer, and 0.5 parts by mass or more and 5 parts by mass or less of a structural unit derived from a vinyl monomer having an ionic substituent with respect to 100 parts by mass of all structural units constituting the modacrylic copolymer. It may be more preferable that the modacrylic copolymer contains 15 parts by mass or more and 84.5 parts by mass or less of a structural unit derived from acrylonitrile, 15 parts by mass or more and 84.5 parts by mass or less of a structural unit derived from the halogen-containing monomer, and 0.5 parts by mass or more and 3 parts by mass or less of a vinyl monomer having an ionic substituent with respect to 100 parts by mass of all structural units constituting the modacrylic copolymer. It may be even more preferable that the modacrylic copolymer contains 30 parts by mass or more and 60 parts by mass or less of a structural unit derived from acrylonitrile, 30 parts by mass or more and 69.5 parts by mass or less of a structural unit derived from the halogen-containing monomer, and 0.5 parts by mass or more and 5 parts by mass or less of a structural unit derived from a vinyl monomer having an ionic substituent with respect to 100 parts by mass of all structural units constituting the modacrylic copolymer. It may be still more preferable that the modacrylic copolymer contains 50.5 parts by mass or more and 69.5 parts by mass or less of a structural unit derived from acrylonitrile, 30 parts by mass or more and 49 parts by mass or less of a structural unit derived from the halogen-containing monomer, and 0.5 parts by mass or more and 5 parts by mass or less of a structural unit derived from a vinyl monomer having an ionic substituent with respect to 100 parts by mass of all structural units constituting the modacrylic copolymer. It may be further preferable that the modacrylic copolymer contains 50.5 parts by mass or more and 69.5 parts by mass or less of a structural unit derived from acrylonitrile, 30 parts by mass or more and 49 parts by mass or less of a structural unit derived from the halogen-containing monomer, and 0.5 parts by mass or more and 3 parts by mass or less of a structural unit derived from a vinyl monomer having an ionic substituent with respect to 100 parts by mass of all structural units constituting the modacrylic copolymer. If the content of the vinyl monomer having an ionic substituent is excessively high, the electrostatic interaction with the foulant is increased, which in turn may reduce the antifouling properties.

The halogen-containing monomer is not particularly limited. Examples of the halogen-containing monomer include vinyl chloride, vinylidene chloride, vinyl bromide, vinylidene bromide, vinyl iodide, and vinylidene iodide. These substances may be used individually or in combination of two or more.

The vinyl monomer having an ionic substituent is not particularly limited and may be, e.g., any of vinyl monomers having various ionic substituents. The ionic substituents may be either anionic substituents or cationic substituents. The anionic substituents are not particularly limited and may include, e.g., a strong electrolysis type anionic substituent and a weak electrolysis type anionic substituent. The strong electrolysis type anionic substituent is not particularly limited and may be, e.g., a sulfonic acid group. The weak electrolysis type anionic substituent is not particularly limited and may be, e.g., a carboxylic acid group or a phosphoric acid group. The cationic substituents are not particularly limited and may include, e.g., a strong electrolysis type cationic substituent and a weak electrolysis type cationic substituent. The strong electrolysis type cationic substituent is not particularly limited and may be, e.g., any of onium groups such as an ammonium group, a phosphonium group, and a sulfonium group. The weak electrolysis type cationic substituent is not particularly limited and may be, e.g., a primary to tertiary amino group, a pyridyl group, or an imino group.

The vinyl monomer having the strong electrolysis type anionic substituent is not particularly limited. Examples of this vinyl monomer include the following: allyl sulfonic acid; methallyl sulfonic acid; 2-acrylamide-2-methylpropane sulfonic acid; styrene sulfonic acid; 2-methyl-1,3,-butadiene-1-sulfonic acid; and salts thereof.

The vinyl monomer having the weak electrolysis type anionic substituent is not particularly limited. Examples of this vinyl monomer include the following: vinyl monomers containing a carboxylic acid group such as acrylic acid, methacrylic acid, maleic acid, and itaconic acid; vinyl monomers containing a phosphoric acid group such as vinyl phosphonic acid and (meth)acryloyloxyalkyl (having 1 to 4 carbon atoms) phosphoric acid; and salts thereof.

In the vinyl monomer having the strong electrolysis type anionic substituent and the vinyl monomer having the weak electrolysis type anionic substituent, when the anionic substituents are present as salts, they may be neutralized completely or may be neutralized to any degree of neutralization. Examples of counter ions in these salts include the following: ammonium ions; monoalkylammonium ions; dialkylammonium ions; trialkylammonium ions; hydroxyalkylammonium ions; alkali metal ions; and alkaline earth metal ions. In the monoalkylammonium ions, the dialkylammonium ions, the trialkylammonium ions, and the hydroxyalkylammonium ions, the carbon number of the alkyl group is not particularly limited and may be, e.g., 1 to 6. Examples of the alkyl group include a methyl group and an ethyl group. The trialkylammonium ions are not particularly limited and may include, e.g., trimethylammonium ions and triethylammonium ions.

The vinyl monomer having the strong electrolysis type cationic substituent is not particularly limited. Examples of this vinyl monomer include the following: vinyl compounds having an ammonium group such as trimethylvinylammonium and salts thereof and diallyl quaternary ammonium such as dimethyldiallylammonium chloride and diethyldiallylammonium chloride and salts thereof.

The vinyl monomer having the weak electrolysis type cationic substituent is not particularly limited. Examples of this vinyl monomer include the following: (meth)acrylic acid ester or (meth)acrylamide having a dialkylamino group such as dimethylaminoethyl (meth)acrylate, diethylaminoethyl (meth)acrylate, dipropylaminoethyl (meth)acrylate, diisapropylaminoethyl (meth)acrylate, dibutylaminoethyl (meth)acrylate, diisobutylaminoethyl (meth)acrylate, di-t-butylaminoethyl (meth)acrylate, dimethylaminopropyl (meth)acrylamide, diethylaminopropyl (meth)acrylamide, dipropylaminopropyl (meth)acrylamide, diisopropylaminopropyl (meth)acrylamide, dibutylaminopropyl (meth)acrylamide, diisobutylaminopropyl (meth)acrylamide, and di-t-butylaminopropyl (meth)acrylamide; styrene having a dialkylamino group such as dimethylaminostyrene and dimethylaminomethylstyrene; vinylpyridine such as 2- or 4-vinylpyridine; N-vinyl heterocyclic compounds such as N-vinylimidazole; and salts thereof.

In the vinyl monomer having the strong electrolysis type cationic substituent and the vinyl monomer having the weak electrolysis type cationic substituent, the cationic substituents may be neutralized completely or may be neutralized to any degree of neutralization. Examples of counter ions in these salts include the following: halide ions such as chloride ions and bromide ions; halogen axoacid ions such as hypochlorite ions and chlorite ions; oxoacid ions such as borate ions, carbonate ions, nitrate ions, phosphate ions, sulfate ions, and chromate ions; and various complex ions.

The above vinyl monomers having the ionic substituents may be used individually or in combination of two or more.

The modacrylic copolymer may be obtained by appropriately copolymerizing one or more than one type of other monomers with the above monomers as long as the effects of one or more embodiments of the present invention are not impaired. The content of a structural unit derived from the other monomers may be preferably 20 parts by mass or less, and more preferably 10 parts by mass or less with respect to 100 parts by mass of all structural units constituting the modacrylic copolymer.

Although the modacrylic copolymer is not particularly limited, the weight-average molecular weight (also referred to as the mass-average molecular weight) of the modacrylic copolymer measured by a GPC method may be preferably 30000 to 150000, and more preferably 50000 to 100000. If the molecular weight is too low, the strength of the porous membrane obtained may be reduced. If the molecular weight is too high, the viscosity becomes excessively high during the membrane formation, and processing may be difficult.

In one or more embodiments of the present invention, the porous membrane is obtained by processing the modacrylic copolymer with any method. The membrane forming method may be, e.g., a thermally induced phase separation method, a non-solvent induced phase separation method, or a drawing method. In one or more embodiments, the non-solvent induced phase separation method may be preferred in terms of a simple production process and low cost.

In one or more embodiments of the present invention, when the porous membrane is formed by the non-solvent induced phase separation method, the modacrylic copolymer is dissolved in a good solvent, and then the resulting solution is brought into contact with a non-solvent so that the solution is solidified to form a porous membrane.

The good solvent is not particularly limited as long as it can dissolve the modacrylic copolymer. Examples of the good solvent include the following: ketones such as acetone, methyl ethyl ketone, and diethyl ketone; sulfoxides such as dimethyl sulfoxide; dimethylformamide; and dimethylacetamide.

The concentration of the modacrylic copolymer solution is not limited and may be appropriately selected in accordance with e.g., the target pore size and water permeation performance of the porous membrane. The concentration of the modacrylic copolymer solution may be preferably 5 to 30% by mass, and more preferably 10 to 20% by mass. If the concentration is too low, the processability cannot be maintained during the membrane formation, and the strength of the porous membrane obtained may be insufficient. If the concentration is too high, the viscosity of the solution becomes excessively high, and processing may be difficult.

In the preparation of the modacrylic copolymer solution, various film forming aids such as a pore opening agent, a lubricant, and a stabilizer may be used in combination with the good solvent. Examples of the pore opening agent include watersoluble polymers such as polyethylene glycol and polyvinyl pyrrolidone. These watersoluble polymers may have any molecular weight in accordance with the target pore size and water permeation performance of the porous membrane. For example, polyethylene glycol with a degree of polymerization of about 100 to 5000 may be suitably used. As far as the membrane can be formed, the amount of the film forming aids to be added may be adjusted as desired in accordance with the target physical properties.

The non-solvent used in the membrane formation does not dissolve the modacrylic copolymer and is miscible with the good solvent. For example, when dimethyl sulfoxide and dimethylformamide are used as good solvents, the non-solvent may be, e.g., any of water, alcohols such as methanol and ethanol, and polar solvents such as acetonitrile. In one or more embodiments, water may be suitably used in terms of economic efficiency and safety. These non-solvents may be used individually or in combination of two or more. Moreover, these non-solvents may be mixed with a good solvent capable of dissolving the modacrylic copolymer to produce a mixed solvent. For example, a mixed solvent of dimethyl sulfoxide and water can be used as the non-solvent. When a mixed solvent is used, in general, the lower the ratio of the non-solvent, the smaller the pore size of the porous membrane. Consequently it is possible to produce a porous membrane that has a high rejection rate for substances to be treated, while the water permeation performance is reduced. Thus, the concentration of the mixed solvent may be appropriately selected in accordance with the desired physical properties of the porous membrane.

Although the porous membrane is not particularly limited, e.g., the thickness of the porous membrane may be preferably 0.01 to 1 mm, and more preferably 0.05 to 0.5 mm. If the thickness is too small the porous membrane may have defects such as cracks, and thus the filtration performance may be reduced. If the thickness is too large, the water permeation performance may be reduced.

The shape of the porous membrane is not limited. For example, the porous membrane may have any shape such as a hollow fiber shape, a flat membrane shape, a spiral shape, a pleated shape, or a tubular shape in accordance with the specific use and purpose. In one or more embodiments, the hollow fiber shape may be preferred because it facilitates the production of the porous membrane, reduces the cost, and allows the porous membrane to be used at low pressure.

Although the porous membrane is not particularly limited, e.g., the membrane strength of the porous membrane in the wet state may be preferably 0.8 MPa or more, more preferably 1.0 MPa or more, and further preferably 1.5 MPa or more. When the membrane strength of the porous membrane in the wet state is within the above range, the porous membrane can have good strength for water treatment.

In one or more embodiments of the present invention, the membrane strength of the porous membrane in the wet state is determined in the following manner. Using an autograph (model number: AGS-J, manufactured by Shimadzu Corporation), a porous membrane in the wet state is pulled at a rate of 0.5 mm/min, and the tensile strength of the porous membrane is measured when fracture occurs.

Although the porous membrane is not particularly limited, e.g., the flux recovery rate of the porous membrane may be preferably 85% or more, more preferably 90% or more, and further preferably 95% or more. When the flux recovery rate is within the above range, the antifouling properties are improved. This means that the antifouling properties are improved as the flux recovery rate becomes higher.

In one or more embodiments of the present invention, the flux recovery rate is determined in the following manner. First an aqueous solution of 1000 ppm sodium humate is allowed to pass through the porous membrane at an initial flux $J_1$ of 200 L/(m²·h) for 1 hour. Then, a flux $J_2$ (L/(m²·h)) of the aqueous solution after backwashing is measured. The flux recovery rate is calculated based on the following formula:

$$\text{Flux recovery rate (\%)} = J_2/J_1 \times 100.$$

Although the porous membrane is not particularly limited, e.g., the rejection rate for humic acid may be preferably 80% or more, more preferably 85% or more, and further preferably 90% or more. The higher the rejection rate, the higher the quality of water obtained.

In one or more embodiments of the present invention, the rejection rate for humic acid is calculated based on the following formula:

Rejection rate for humic acid (%)=100−$C_2/C_1$×100, where $C_1$ represents the initial concentration of the humic acid in the aqueous solution of 1000 ppm sodium humate used in the measurement of the flux recovery rate, and $C_2$ represents the concentration of the humic acid in the treated water that has passed through the porous membrane.

Although the porous membrane is not particularly limited, e.g., the water permeation performance of the porous membrane may be preferably 10 to 1000 L/($m^2$·atm·h), and more preferably 50 to 500 L/($m^2$·atm·h). When the water permeation performance is within the above range, the porous membrane can be suitably used for water treatment.

In one or more embodiments of the present invention, the water permeation performance is determined in the following manner. Using a cross-flow module for a flat membrane with an effective area of 23 $cm^2$, ultrapure water is allowed to flow with a water pressure of 0.1 MPa (1 atm). The water permeation performance is calculated based on the following formula:

Water permeation performance (L/($m^2$·atm·h))= $V/(A×P×\Delta t)$, where V(L) represents the volume of ultrapure water that has passed through the membrane, A ($m^2$) represents the effective area of the membrane, P (atm) represents the water pressure, and $\Delta t$ (h) represents the measurement time.

Although the porous membrane is not particularly limited, from the viewpoint of improving the chemical resistance, e.g., the retention of flux recovery rate may be preferably 90% or more even after the porous membrane is treated with sodium hypochlorite for 24 hours or more. Further, the retention of flux recovery rate may be more preferably 90% or more even after the porous membrane is treated with sodium hypochlorite for 1 week.

In one or more embodiments of the present invention, the retention of flux recovery rate is determined in the following manner. First, the porous membrane is immersed in an aqueous solution of sodium hypochlorite (690 ppm, pH 11) for a predetermined period of time. Then, the porous membrane is sufficiently washed with ultrapure water and dried. Subsequently, the flux recovery rate of the dried membrane is measured by the above method. The retention of flux recovery rate is calculated based on the following formula:

Retention of flux recovery rate (%)=$R_2/R_1$×100, where $R_1$ represents the flux recovery rate of the porous membrane before the immersion in the aqueous solution of sodium hypochlorite, and $R_2$ represents the flux recovery rate of the porous membrane after the immersion in the aqueous solution of sodium hypochlorite.

Although the porous membrane is not particularly limited, from the viewpoint of improving the chemical resistance, e.g., the retention of contact angle may be preferably 95% or more even after the porous membrane is treated with sodium hypochlorite for 24 hours or more. Further, the retention of contact angle may be more preferably 95% or more even after the porous membrane is treated with sodium hypochlorite for 1 week.

In one or more embodiments of the present invention, the retention of contact angle is determined in the following manner. First, the porous membrane is immersed in an aqueous solution of sodium hypochlorite (690 ppm, pH 11) for a predetermined period of time. Then, the porous membrane is sufficiently washed with ultrapure water and dried. Subsequently, the contact angle of the dried membrane is measured by a contact angle measuring device (Drop Master 300, manufactured by Kyowa Interface Science Co., Ltd.) Specifically first, the membrane is cut into an appropriate size and immersed in a glass cell filled with ultrapure water. Then, 5 µL of air bubbles are made with a J-shaped injection needle, and the air bubbles are placed on the surface of the membrane from the lower side. The angle formed between the membrane/water interface and the water/air interface is defined as the contact angle. To eliminate an error, the same measurement is repeatedly performed at 10 randomly selected points on the membrane, and the average value is obtained as the contact angle. The retention of contact angle is calculated based on the following formula:

Retention of contact angle (%)=$A_2/A_1$×100, where $A_1$ represents the contact angle of the porous membrane before the immersion in the aqueous solution of sodium hypochlorite, and $A_2$ represents the contact angle of the porous membrane after the immersion in the aqueous solution of sodium hypochlorite.

The porous membrane can be suitably used for water treatment that removes impurities contained in, e.g., river water and industrial water. For example, the porous membrane can be used as a filter medium, e.g., in a cartridge for a water purifier or a membrane unit for waste water treatment.

EXAMPLES

Hereinafter, one or more embodiments of the present invention will be described in detail based on examples. However, the present invention is not limited only to the following examples.

Example 1

A modacrylic copolymer consisting of 49.0 parts by mass of a structural unit derived from a vinyl chloride monomer and 51.0 parts by mass of a structural unit derived from acrylonitrile was produced by an emulsion polymerization method. Next, 15 g of the modacrylic copolymer and 40 g of polyethylene glycol 200 as a pore opening agent were dissolved in 45 g of dimethyl sulfoxide to form a modacrylic copolymer solution. The modacrylic copolymer solution was applied to a glass plate with a film applicator and then brought into contact with a 60% by mass dimethyl sulfoxide aqueous solution to provide a porous membrane (with a thickness of 124 µm).

Example 2

A modacrylic copolymer consisting of 49.0 parts by mass of a structural unit derived from a vinyl chloride monomer, 50.5 parts by mass of a structural unit derived from acrylonitrile, and 0.5 parts by mass of a structural unit derived from sodium styrenesulfonate was produced by an emulsion polymerization method. Next, 15 g of the modacrylic copolymer and 40 g of polyethylene glycol 200 as a pore opening agent were dissolved in 45 g of dimethyl sulfoxide to form a modacrylic copolymer solution. The modacrylic copolymer solution was applied to a glass plate with a film applicator and then brought into contact with a 60% by mass dimethyl sulfoxide aqueous solution to provide a porous membrane (with a thickness of 119 μm).

Example 3

A modacrylic copolymer consisting of 47.0 parts by mass of a structural unit derived from a vinyl chloride monomer, 51.0 parts by mass of a structural unit derived from acrylonitrile, and 2.0 parts by mass of a structural unit derived from sodium styrenesulfonate was produced by an emulsion polymerization method. Next, 13 g of the modacrylic copolymer and 41 g of polyethylene glycol 200 as a pore opening agent were dissolved in 46 g of dimethyl sulfoxide to form a modacrylic copolymer solution. The modacrylic copolymer solution was applied to a glass plate with a film applicator and then brought into contact with a 60% by mass dimethyl sulfoxide aqueous solution to provide a porous membrane (with a thickness of 114 μm).

Comparative Example 1

First, 15 g of polyacrylonitrile (homopolymer of acrylonitrile manufactured by Sigma-Aldrich, weight average molecular weight: 150000) was dissolved in 85 g of dimethyl sulfoxide to form a polyacrylonitrile solution. The polyacrylonitrile solution was applied to a glass plate with a film applicator and then brought into contact with a 60% by mass dimethyl sulfoxide aqueous solution to provide a porous membrane (with a thickness of 163 μm).

Comparative Example 2

First, 15 g of polyvinyl chloride (homopolymer of vinyl chloride monomer, weight average molecular weight: 55000) and 10 g of polyethylene glycol 200 as a pore opening agent were dissolved in 75 g of tetrahydrofuran to form a polyvinyl chloride solution. The polyvinyl chloride solution was applied to a glass plate with a film applicator and then brought into contact with a 60% by mass tetrahydrofuran aqueous solution to provide a porous membrane (with a thickness of 85 μm).

Comparative Example 3

First, 3.9 g of polyacrylonitrile which was the same as that used in Comparative Example 1 and 0.4 g of Pluronic F-127 (manufactured by Cosmo Bio Co., Ltd.) as a hydrophilic polymer were dissolved in 25.7 g of dimethylacetamide. The polymer solution thus obtained was cast on a nonwoven fabric with a film applicator. Then, the nonwoven fabric was immersed in a coagulation tank (ion exchanged water at about 20° C.) to provide a porous membrane (with a thickness of 200 μm).

Comparative Example 4

First, 3.9 g of polyvinyl chloride which was the same as that used in Comparative Example 2 and 0.4 g of methacryloyloxyethylphosphorylcholine-co-poly(propylene glycol) methacrylate were dissolved in 25.7 g of dimethylacetamide. The polymer solution thus obtained was cast on a nonwoven fabric with a film applicator. Then, the nonwoven fabric was immersed in a coagulation tank (ion exchanged water at about 20° C.) to provide a porous membrane (with a thickness of 200 μm).

The membrane strength in the wet state, the molecular weight cut-off, the water permeation performance, the flux recovery rate, and the rejection rate for each of the porous membranes in Examples 1 to 3 and Comparative Examples 1 to 2 were evaluated in the following manner. Table 1 shows the results of the evaluation.

(Membrane Strength in Wet State)

Using an autograph (model number: AGS-J, manufactured by Shimadzu Corporation), the porous membrane in the wet state was pulled at a rate of 0.5 mm/min, and the tensile strength of the porous membrane was measured when fracture occurred. This tensile strength was used as the membrane strength in the wet state.

(Molecular Weight Cut-Off)

The molecular weight cut-off was a molecular weight at which the rejection rate determined by the following method was 90% or more. The rejection rate was measured using a cross-flow module for a flat membrane with an effective area of 8.04 cm$^2$. Polyethylene glycol with a weight average molecular weight of 8000 (MP Biochemicals), polyethylene glycol with a weight average molecular weight of 20000 (manufactured by Sigma-Aldrich), and polyethylene oxide with different weight average molecular weights of 100000, 200000, 400000, and 1000000 (manufactured by Sigma-Aldrich) were used as indicator molecules. A solution was prepared by dissolving each indicator molecule at a concentration of 200 ppm in ion exchanged water. This solution was allowed to flow at a flow rate of 150 ml/min with a water pressure of 0.1 MPa. Based on the concentration of the indicator molecules before and after the filtration with the porous membrane, the rejection rate was determined by the following formula:

$$\text{Rejection rate (\%)}=(1-C_f/C_f)\times 100,$$

where $C_N$ represents the concentration of the indicator molecules after the filtration, and $C_f$ represents the concentration of the indicator molecules before the filtration.

(Water Permeation Performance)

Using a cross-flow module for a flat membrane with an effective area of 23 cm$^2$, ultrapure water was allowed to flow with a water pressure of 0.1 MPa (1 atm). The water permeation performance was calculated based on the following formula:

$$\text{Water permeation performance } (L/(m^2\cdot atm\cdot h))=V/(A\times P\times \Delta t),$$

where V(l) represents the volume of ultrapure water that had passed through the membrane, A (m$^2$) represents the effective area of the membrane, P(atm) represents the water pressure, and Δt(h) represents the measurement time.

(Flux Recovery Rate)

An aqueous solution of 1000 ppm sodium humate (manufactured by Sigma-Aldrich, guaranteed reagent) was allowed to pass through the porous membrane at an initial flux J$_1$ of 200 L/(m$^2$·h) for 1 hour. Then, a flux J$_2$ (L/(m$^2$·h)) of the aqueous solution after backwashing was measured. The flux recovery rate was calculated based on the following formula:

$$\text{Flux recovery rate (\%)}=J_2/J_1\times 100.$$

(Rejection Rate)

The rejection rate was calculated based on the following formula:

$$\text{Rejection rate (\%)}=100-(C_2/C_1\times 100),$$

where $C_1$ represents the initial concentration of the humic acid in the aqueous solution of 1000 ppm sodium humate used in the measurement of the flux recovery rate, and $C_2$ represents the concentration of the humic acid in the treated water that had passed through the porous membrane.

TABLE 1

|  | Membrane strength in wet state (MPa) | Molecular weight cut-off (kDa) | Water permeation performance (L/(m$^2$atm · h)) | Flux recovery rate (%) | Rejection rate (%) |
| --- | --- | --- | --- | --- | --- |
| Example 1 | 1.36 | 250 | 113 | 91 | 56 |
| Example 2 | 1.52 | 300 | 114 | 90 | 96 |
| Example 3 | 0.95 | 350 | 110 | 99 | 97 |
| Comparative Example 1 | 2.10 | 380 | 110 | 75 | 97 |
| Comparative Example 2 | 4.96 | 440 | 143 | 85 | 50 |

As can be seen from the data in Table 1, the porous membranes including the modacrylic copolymer resin in Examples had a higher flux recovery rate than the porous membrane including polyacrylonitrile in Comparative Example 1 and the porous membrane including polyvinyl chloride in Comparative Example 2, and thus were superior in antifouling properties. The porous membranes including the modacrylic copolymer resin in Examples also had practically sufficient membrane strength and water permeation rate.

The retention of flux recovery rate of the porous membrane in Example 2 was evaluated in the following manner in order to evaluate the chemical resistance of the porous membrane to sodium hypochlorite. Table 2 shows the results of the evaluation.

(Retention of Flux Recovery Rate)

The porous membrane was immersed in an aqueous solution of sodium hypochlorite (690 ppm, pH 11) for a predetermined period of time. Then, the porous membrane was sufficiently washed with ultrapure water and dried. Subsequently the flux recovery rate of the dried membrane was measured by the above method. The retention of flux recovery rate was calculated based on the following formula:

Retention of flux recovery rate (%)=$R_2/R_1$×100, where $R_1$ represents the flux recovery rate of the porous membrane before the immersion in the aqueous solution of sodium hypochlorite, and $R_2$ represents the flux recovery rate of the porous membrane after the immersion in the aqueous solution of sodium hypochlorite.

TABLE 2

| | Retention of flux recovery rate (%) | | |
| --- | --- | --- | --- |
| | 6 hours | 24 hours | 7 days |
| Example 2 | 100 | 98.9 | 98.9 |

The contact angle of the porous membrane in Example 2 was evaluated in the following manner. Then, the porous membrane in Example 2 was compared with the hydrophilized PAN membrane in Comparative Example 3 and the hydrophilized PVC membrane in Comparative Example 4. Table 3 shows the results of the evaluation.

(Contact Angle)

The porous membrane was immersed in an aqueous solution of sodium hypochlorite (690 ppm, pH 11) for a predetermined period of time. Then, the porous membrane was sufficiently washed with ultrapure water and dried. Subsequently the contact angle of the dried membrane was measured by a contact angle measuring device (Drop Master 300, manufactured by Kyowa Interface Science Co., Ltd.)

Specifically first, the membrane was cut into an appropriate size and immersed in a glass cell filled with ultrapure water. Then, 5 µL of air bubbles were made with a J-shaped injection needle, and the air bubbles were placed on the surface of the membrane from the lower side. The angle formed between the membrane/water interface and the water/air interface was defined as the contact angle. To eliminate an error, the same measurement was repeatedly performed at 10 randomly selected points on the membrane, and the average value was obtained as the contact angle. The retention of contact angle was calculated based on the following formula:

Retention of contact angle (%)=$A_2/A_1$×100, where $A_1$ represents the contact angle of the porous membrane before the immersion in the aqueous solution of sodium hypochlorite, and $A_2$ represents the contact angle of the porous membrane after the immersion in the aqueous solution of sodium hypochlorite.

TABLE 3

| | Contact angle (°) | | | Retention of contact angle (%) | |
| --- | --- | --- | --- | --- | --- |
| | Before immersion | 24 hours | 7 days | 24 hours | 7 days |
| Example 2 | 143 | 143 | 147 | 100 | 102.8 |
| Comparative Example 3 | 140 | 127 | unmeasured | 90.7 | unmeasured |
| Comparative Example 4 | 135 | 133 | 127 | 98.5 | 94.1 |

As can be seen from the results in Table 2, the porous membrane in Example 2 maintained a high retention of flux recovery rate of 98.9% even after it was treated with sodium hypochlorite for 7 days. Moreover, as can be seen from the results in Table 3, the contact angle of the porous membrane in Example 2 was not reduced even after it was treated with sodium hypochlorite for 7 days, while the contact angle of each of the porous membranes in Comparative Examples 3 and 4 was reduced due to the treatment with sodium hypochlorite. These results confirmed that the porous membranes in Examples had high chemical resistance to sodium hypochlorite.

The porous membrane in one or more embodiments of the present invention can be suitably used for water treatment that removes impurities contained in, e.g., river water and industrial water.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A porous membrane comprising a modacrylic copolymer, wherein the modacrylic copolymer comprises, with respect to 100 parts by mass of all structural units constituting the modacrylic copolymer:
   30 to 60 parts by mass of a structural unit derived from acrylonitrile;
   30 to 69.5 parts by mass of a structural unit derived from at least one halogen-containing monomer selected from the group consisting of vinyl halide and vinylidene halide; and
   0.5 to 5 parts by mass of a structural unit derived from a vinyl monomer having an ionic substituent,
   wherein
   a rejection rate of the porous membrane for humic acid is at least 80%, wherein the rejection rate is calculated as follows:

Rejection rate for humic acid (%)=100−$C_2/C_1$×100, wherein $C_1$ represents the initial concentration of the humic acid in an aqueous solution of 1000 ppm sodium humate used in the measurement of the flux recovery rate, and $C_2$ represents a concentration of the humic acid in treated water that has passed through the porous membrane.

2. The porous membrane according to claim 1, wherein the ionic substituent in the vinyl monomer is an anionic substituent.

3. The porous membrane according to claim 1, wherein the ionic substituent in the vinyl monomer is a sulfonic acid group.

4. The porous membrane according to claim 1, wherein the at least one halogen-containing monomer is at least one selected from the group consisting of vinyl chloride and vinylidene chloride.

5. The porous membrane according to claim 1, wherein the porous membrane has a shape selected from the group consisting of a hollow fiber shape, a flat membrane shape, a spiral shape, a pleated shape, and a tubular shape.

6. A method for producing the porous membrane, the method comprising:
   preparing a modacrylic copolymer solution by dissolving a modacrylic copolymer in a solvent; and
   forming a porous membrane comprising the modacrylic copolymer by bringing the modacrylic copolymer solution into contact with a non-solvent for the modacrylic copolymer such that the modacrylic copolymer solution is solidified,
   wherein the modacrylic copolymer comprises, with respect to 100 parts by mass of all structural units constituting the modacrylic copolymer:
   30 to 60 parts by mass of a structural unit derived from acrylonitrile;
   30 to 69.5 parts by mass of a structural unit derived from at least one halogen-containing monomer selected from the group consisting of vinyl halide and vinylidene halide, and
   0.5 to 5 parts by mass of a structural unit derived from a vinyl monomer having an ionic substituent, wherein
   a rejection rate of the porous membrane for humic acid is at least 80%, wherein the rejection rate is calculated as follows:

rejection rate for humic acid (%)=100−$C_2/C_1$×100, wherein $C_1$ represents the initial concentration of the humic acid in an aqueous solution of 1000 ppm sodium humate used in the measurement of the flux recovery rate, and $C_2$ represents a concentration of the humic acid in treated water that has passed through the porous membrane.

7. The porous membrane according to claim 1, wherein the ionic substituent in the vinyl monomer is at least one selected from the group consisting of a phosphoric acid group, ammonium group, phosphonium group, sulfonium group, pyridyl group, amino group, and imino group.

8. The porous membrane according to claim 1, wherein the modacrylic copolymer has a weight average molecular weight of from 30,000 to 1,500,000.

9. The porous membrane according to claim 1,
   wherein
   a flux recovery rate of the porous membrane is at least 85%, wherein the flux recovery rate is determined as follows:
   an aqueous solution of 1000 ppm sodium humate is allowed to pass through the porous membrane at an initial flux $J_1$ of 200 L/m²·h for 1 hour,
   a flux $J_2$ in L/m²·h of the aqueous solution after backwashing is measured and the flux recovery rate is calculated as follows:

Flux recovery rate (%)=$J_2/J_1$×100.

10. The porous membrane according to claim 1, wherein the modacrylic copolymer has a weight average molecular weight of from 50,000 to 100,000.

11. The method according to claim 6, wherein the modacrylic copolymer has a weight average molecular weight of from 30,000 to 1,500,000, and
    wherein
    a flux recovery rate of the porous membrane is at least 85%, wherein the flux recovery rate is determined as follows:
    an aqueous solution of 1000 ppm sodium humate is allowed to pass through the porous membrane at an initial flux $J_1$ of 200 L/m²·h for 1 hour, and
    a flux $J_2$ in L/m²·h of the aqueous solution after backwashing is measured and the flux recovery rate is calculated as follows:

Flux recovery rate (%)=$J_2/J_1$×100.

12. The method according to claim 6, wherein the solvent is at least one selected from the group consisting of a ketone, sulfoxide, dimethylformamide, and dimethylacetamine, and wherein a content of the modacrylic copolymer in the solvent is from 5 mass % to 30 mass %.

13. The method according to claim 6, wherein the non-solvent does not dissolve the modacrylic copolymer and is miscible with the solvent.

* * * * *